US012012917B2

(12) United States Patent
Munoz et al.

(10) Patent No.: US 12,012,917 B2
(45) Date of Patent: Jun. 18, 2024

(54) PUMP HOUSING WITH RELIEF CUT FOR LOBE CLEARANCE

(71) Applicant: Cummins Inc., Columbus, IN (US)

(72) Inventors: Roberto M. Munoz, Columbus, IN (US); Amanda Baker, Columbus, IN (US); Yip Kwok, Indianapolis, IN (US); Thomas M. Yeager, Columbus, IN (US)

(*) Notice: Subject to any disclaimer, the term of this patent is extended or adjusted under 35 U.S.C. 154(b) by 0 days.

(21) Appl. No.: 18/181,007

(22) Filed: Mar. 9, 2023

(65) Prior Publication Data

US 2023/0213011 A1 Jul. 6, 2023

Related U.S. Application Data

(63) Continuation of application No. PCT/US2021/050704, filed on Sep. 16, 2021.

(60) Provisional application No. 63/082,598, filed on Sep. 24, 2020.

(51) Int. Cl.
*F02M 59/10* (2006.01)
*F02M 59/08* (2006.01)

(52) U.S. Cl.
CPC .......... *F02M 59/102* (2013.01); *F02M 59/08* (2013.01)

(58) Field of Classification Search
CPC ....... F02M 59/102; F02M 59/08; F02M 59/06
See application file for complete search history.

(56) References Cited

U.S. PATENT DOCUMENTS 7,311,087 B2 * 12/2007 Shaull .................. F02M 59/102 123/495
2007/0020131 A1 * 1/2007 Schroeder ............... F04B 53/22 417/521
2007/0071622 A1 * 3/2007 Schoeppe ............ F02M 59/102 417/470
2009/0272365 A1 11/2009 Kunz
2010/0037865 A1 * 2/2010 Fuchs .................. F02M 59/102 417/364
2015/0275834 A1 * 10/2015 Crofts ..................... F01L 1/146 92/129

(Continued)

FOREIGN PATENT DOCUMENTS

EP 1767771 B1 7/2008
EP 2134966 B1 3/2017

(Continued)

OTHER PUBLICATIONS

International Search Report and Written Opinion dated Dec. 30, 2021 in PCTUS201050704; 10 pgs.

*Primary Examiner* — Sizo B Vilakazi
(74) *Attorney, Agent, or Firm* — Taft, Stettinius & Hollister LLP

(57) ABSTRACT

The disclosure relates to fuel pump housings and fuel pump systems incorporating the same. The fuel pump housing includes at least one tappet housing portion configured to receive at least one tappet assembly and a main bore portion fluidly coupled with the at least one tappet housing portion such that the main bore receives a camshaft. The main bore includes an uncut portion and at least one relief cut portion proximal to the at least one tappet housing portion. The uncut portion defines a first centerline, and the relief cut portion defines a second centerline offset from the first centerline.

20 Claims, 5 Drawing Sheets

(56) References Cited

U.S. PATENT DOCUMENTS

| | | | | |
|---|---|---|---|---|
| 2016/0215663 | A1 * | 7/2016 | Kuroda .................... | F01M 1/02 |
| 2019/0293038 | A1 | 9/2019 | Stritzel et al. | |

FOREIGN PATENT DOCUMENTS

| | | | |
|---|---|---|---|
| WO | 2012048961 | A1 | 4/2012 |
| WO | 2012095270 | A1 | 7/2012 |
| WO | 2014135313 | A1 | 9/2014 |
| WO | 2016058878 | A1 | 4/2016 |

* cited by examiner

PUMP HOUSING WITH RELIEF CUT FOR LOBE CLEARANCE

CROSS-REFERENCE TO RELATED APPLICATION

This application is a continuation of International PCT Application No. PCT/US2021/050704 filed on Sep. 16, 2021, which claims priority to U.S. Provisional Application No. 63/082,598, filed on Sep. 24, 2020, which are incorporated herein by reference in their entirety for all purposes.

FIELD OF THE DISCLOSURE

The present disclosure relates generally to fuel systems and more specifically to a fuel pump with a guided reciprocating tappet assembly, and methods for guiding a tappet assembly and assembling a fuel pump.

BACKGROUND OF THE DISCLOSURE

Various fuel pumps that are used to provide fuel to internal combustion engines are driven by a lobed camshaft that displaces a tappet assembly with a roller that rolls along the cam lobe. The reciprocating motion of the tappet assembly generates fuel flow that is used by the internal combustion engine to generate power. These types of fuel pumps are frequently used in common rail fuel systems applications where high fuel pressures are required. In such fuel pumps, the reciprocating tappet assembly is guided so that the centerline of the roller and the centerline of the camshaft are maintained in an aligned position with respect to each other. While such configuration enables high fuel pressures in fuel system application, there remains room for improvement in the technology.

FIG. 1 shows a fuel pump housing 100 with tappet guide bores 102 in which tappet assemblies 101 are received. Each tappet assembly 101 includes a tappet spring 104, a lower spring retainer 105, a tappet shell 106, a tappet roller 108, and a tappet pin 110; the tappet assembly 101 is moved vertically by a camshaft 112. The tappet assembly 101 in turn moves a plunger 114. Two different tappet positions are shown, where position (A) is a bottom dead center (BDC) position 120 and position (B) is a top dead center (TDC) position 122. In the conventional design, each tappet pin 110 has a centerline 116 which reaches a certain position at BDC 120 (shown in broken line), and each tappet guide bore 102 ends at an end portion 118.

One problem with the conventional design is that the tappet assembly 101 is likely to fail if the centerline 116 of the tappet pin 110 falls below the end portion 118 of the tappet guide bore 102 during the BDC position 120. The high-speed operating condition of the engine aggravates and accelerates the failure of the tappet assembly 101. The tappet assembly 101 is likely to fail even if the centerline 116 exceeds the end portion 118 by a few millimeters. As such, there remains a need for an improved design of a fuel pump housing to be used with tappet assembly to reduce such failures.

SUMMARY OF THE DISCLOSURE

According to the present disclosure, various embodiments of a fuel pump housing are disclosed. The fuel pump housing includes at least one tappet housing portion configured to receive at least one tappet assembly and a main bore portion fluidly coupled with the at least one tappet housing portion, the main bore portion configured to receive a camshaft. The main bore portion includes an uncut portion and at least one relief cut portion proximal to the at least one tappet housing portion. The uncut portion defines a first centerline, and the relief cut portion defines a second centerline offset from the first centerline.

In some examples, the first centerline is offset from a central longitudinal axis of the camshaft and aligns with the longitudinal axis of the camshaft. In some examples, the second centerline aligns with a central longitudinal axis of the housing and is positioned closer to the at least one tappet housing portion than the first centerline. In some examples, the at least one relief cut portion is formed to increase clearing between an outer surface of a lobe of the camshaft and an inner wall of the main bore portion. In some examples, the at least one relief cut portion has a length shorter than a diameter of the corresponding tappet housing portion. In some examples, the housing is made of a single monolithic piece of metal.

In some examples, the housing further includes side bearing portions positioned adjacent to the main bore portion and sharing a central axis with the second centerline. In some examples, a fillet is formed at a transition portion between one of the side bearing portions and the main bore portion to reduce sharp edge at the transition portion. In some examples, a fillet is formed at a transition portion between the at least one tappet housing portion and the at least one relief cut portion to reduce sharp edge at the transition portion.

In some examples, the at least one tappet housing portion is a plurality of tappet housing portions, and one or more of the at least one relief cut portion has a length spanning across diameters of at least two of the plurality of tappet housing portions. In some examples, a single continuous relief cut portion has the length spanning across the diameters of the plurality of tappet housing portions. Also disclosed are fuel pump systems which includes the fuel pump housing as disclosed above, as well as a camshaft received in the main bore portion and operatively coupled with the at least one tappet assembly and at least one tappet assembly received in the at least one tappet housing portion.

Furthermore, various embodiments of a fuel pump system for an engine are also disclosed. The fuel pump system includes at least one tappet assembly, a camshaft operatively coupled with the at least one tappet assembly, and a fuel pump housing. The fuel pump housing includes at least one tappet housing portion configured to receive the at least one tappet assembly, and a main bore portion fluidly coupled with the at least one tappet housing portion, the main bore portion configured to receive the camshaft. The main bore portion includes an uncut portion and at least one relief cut portion proximal to the at least one tappet housing portion. The uncut portion defines a first centerline, and the relief cut portion defines a second centerline offset from the first centerline.

In some examples, the first centerline is offset from a central longitudinal axis of the housing and aligns with the longitudinal axis of the camshaft. In some examples, the second centerline aligns with a central longitudinal axis of the housing and is positioned closer to the at least one tappet housing portion than the first centerline. In some examples, the at least one relief cut portion is formed to increase clearing between an outer surface of a lobe of the camshaft and an inner wall of the main bore portion. In some examples, the housing is made of a single monolithic piece of metal.

In some examples, the fuel pump housing further includes side bearing portions positioned adjacent to the main bore portion and sharing a central axis with the second centerline. In some examples, a fillet is formed at a transition portion between one of the side bearing portions and the main bore portion to reduce sharp edge at the transition portion. In some examples, a fillet is formed at a transition portion between the at least one tappet housing portion and the at least one relief cut portion to reduce sharp edge at the transition portion.

Furthermore, various embodiments of an engine are disclosed. The engine includes a fuel pump system, a plurality of pistons operatively coupled with the fuel pump system, and a crankshaft operatively coupled with the plurality of pistons. The fuel pump system includes at least one tappet assembly, a camshaft operatively coupled with the at least one tappet assembly, and a fuel pump housing. The fuel pump includes at least one tappet housing portion configured to receive the at least one tappet assembly and a main bore portion fluidly coupled with the at least one tappet housing portion. The main bore portion is configured to receive the camshaft. The main bore portion includes an uncut portion and at least one relief cut portion proximal to the at least one tappet housing portion. The uncut portion defines a first centerline, and the relief cut portion defines a second centerline that is offset from the first centerline.

Additional features and advantages of the present disclosure will become apparent to those skilled in the art upon consideration of the following detailed description of the illustrative embodiment exemplifying the best mode of carrying out the disclosure as presently perceived.

BRIEF DESCRIPTION OF THE DRAWINGS

The detailed description of drawings particularly refers to the accompanying figures in which.

DETAILED DESCRIPTION

The embodiments of the disclosure described herein are not intended to be exhaustive or to limit the disclosure to the precise forms disclosed. Rather, the embodiments selected for description have been chosen to enable one skilled in the art to practice the disclosure.

Figure 1:
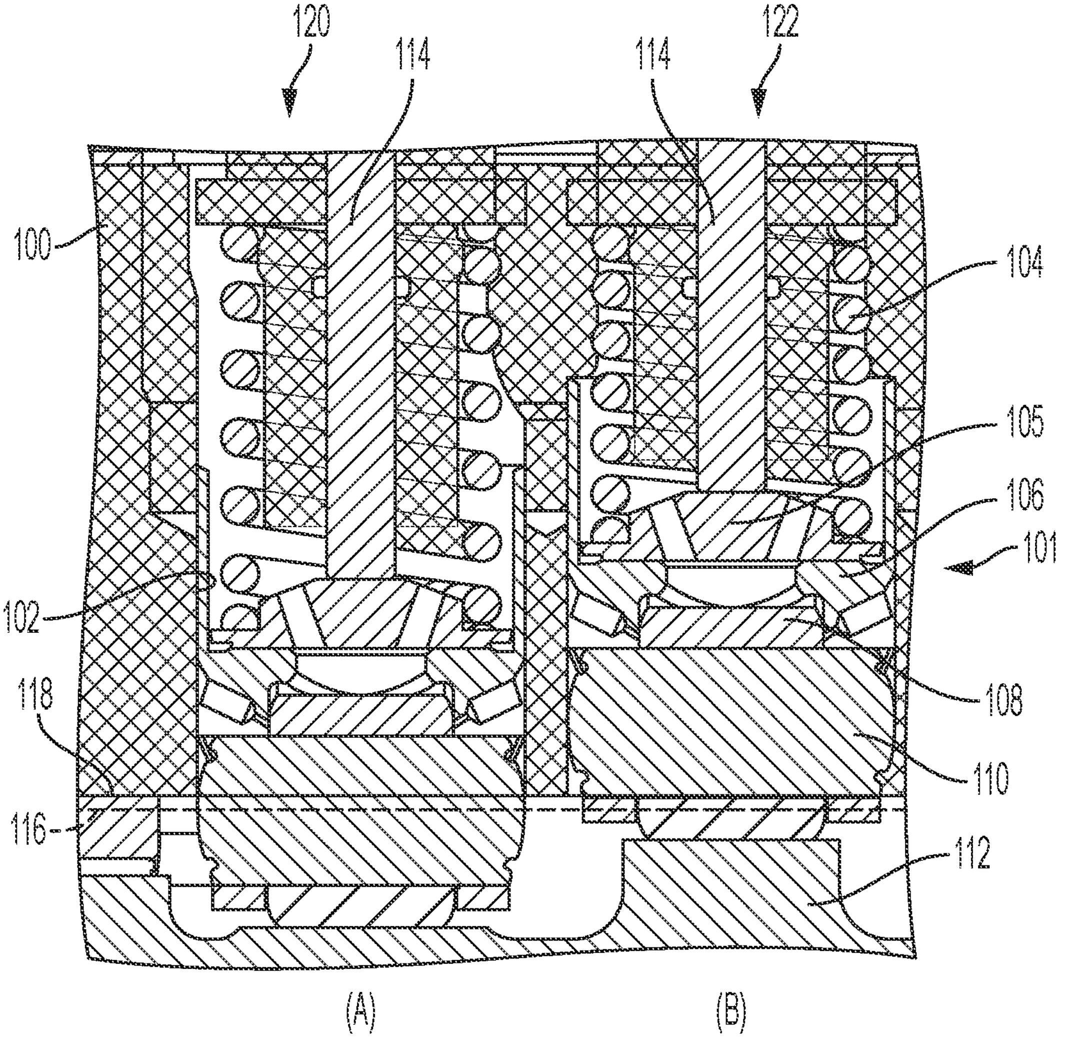
FIG. 1 PRIOR ART
FIG. 1 shows a fuel pump housing with tappet assemblies in BDC and TDC positions.
Figure 2:
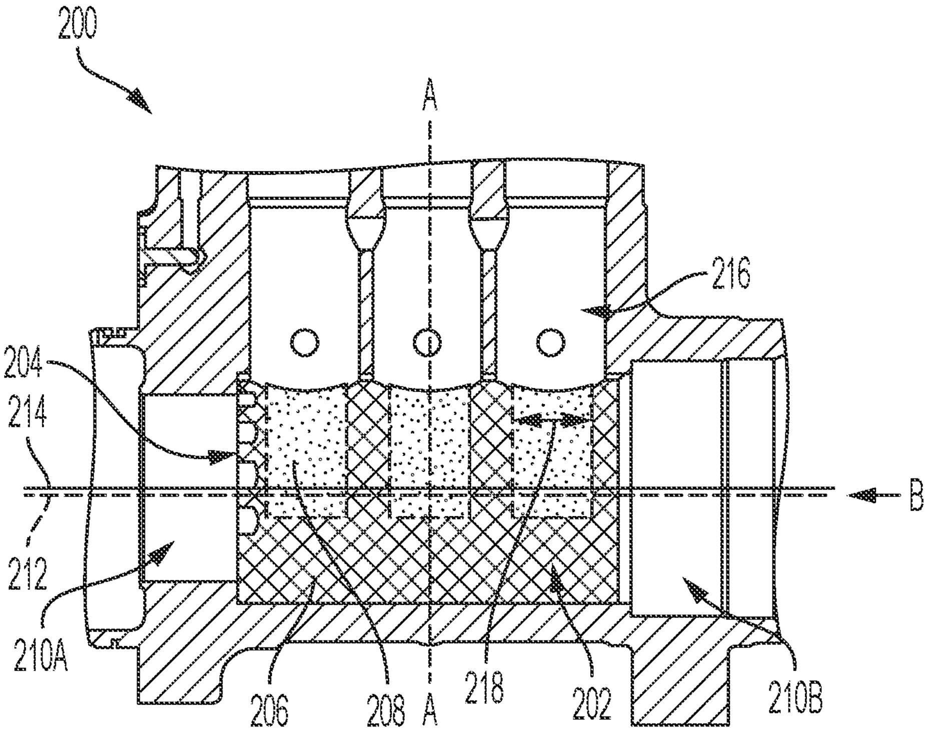
FIG. 2 shows a pump housing with relief cut portions.

Referring to FIG. 2, a housing 200 for a common-rail multi-cylinder fuel pump for an engine such as an internal combustion engine is illustrated. In some examples, the housing 200 may be formed by cutting a single monolithic piece of metal, while in other examples, the housing 200 may be formed by attaching two or more separate pieces together such as by welding. The housing 200 includes a main bore portion 202, a pair of side bearing portions 210 located at either side of the main bore portion 202 and adjacent thereto, as well as one or more tappet housing portions 216. The main bore 202 houses the camshaft 112 and the tappet housing portions 216 house the tappet assemblies 101 referred to in FIG. 1. The main bore 202 includes an uncut portion 206 and a relief cut portion 208. In some examples, the transition portion between the side bearing 210A or 210B and the main bore 202 may include a fillet 204 that is carved into the housing 200 to reduce sharp edges in the transition portion. In some examples, the fillet 204 may be implemented when the transition portion has a right angle. In some examples, an additional fillet (not shown) may also be formed at the transition portion between the tappet housing portion 216 and the relief cut portion 208 of the main bore 202.

The uncut portion 206 and the relief cut portion 208 differ from each other in that their centerlines are different. A centerline is a central axis of a cross-sectional area of a component. In the example shown, a centerline 212 (broken line in FIG. 2) is the central axis of the uncut portion 206 and a centerline 214 (solid line in FIG. 2) is the central axis of the relief cut portion 208. A relief cut is defined as a cut or carving made into the housing 200 at the main bore 202 such that the centerline 214 of the relief cut portion 208 is offset from the centerline 212 of the remaining uncut portion 206 of the main bore 202. In other words, the centerlines 212 and 214 are offset from each other due to the relief cut made in the main bore 202. As shown, the relief cut portion 208 is positioned closer or proximal to the tappet housing portion 216. The positioning of the relief cut portions 208 enables the offset between the centerlines 212 and 214.

In some examples, the offset is such that the relief-cut centerline 214 is a certain distance closer or proximal to the tappet housing portion 216 than the uncut centerline 212. In some examples, the distance of the offset may be less than 1 mm, between 1 mm and 2 mm, between 2 mm and 3 mm, or greater than 3 mm, as suitable. The centerline 214 of the relief cut portion 208 is also the centerline of the side bearings 210. That is, the side bearings 210 share the same central axis with the relief cut portion 208, and this central axis may be defined as a central longitudinal axis of the housing 200.

The main bore 202 is partially offset from the side bearings 210 because the centerline 212 of the uncut portion 206 of the main bore 202 is positioned below the centerline 214 (which is also the central axis of the side bearings 210) by a predetermined distance, for example less than 1 mm, between 1 mm and 2 mm, between 2 mm and 3 mm, or greater than 3 mm, etc., as suitable. As such, the centerline 212 of the uncut portion 206 deviates from the central longitudinal axis of the housing 200, defined by the centerline 214. When the housing 200 is implemented with the tappet assembly (or assemblies) 101 and the crankshaft 112 shown in FIG. 1, a central longitudinal axis of the crankshaft 112 aligns with the centerline 212 of the uncut portion 206 which remains offset from the centerline 214, in order to accommodate for the centerline 116 of the tappet pin 110 falling below the end portion 118 of the tappet guide bore 102 during the BDC position 120, which is known to cause failure of the tappet assembly 101.

Figure 3:
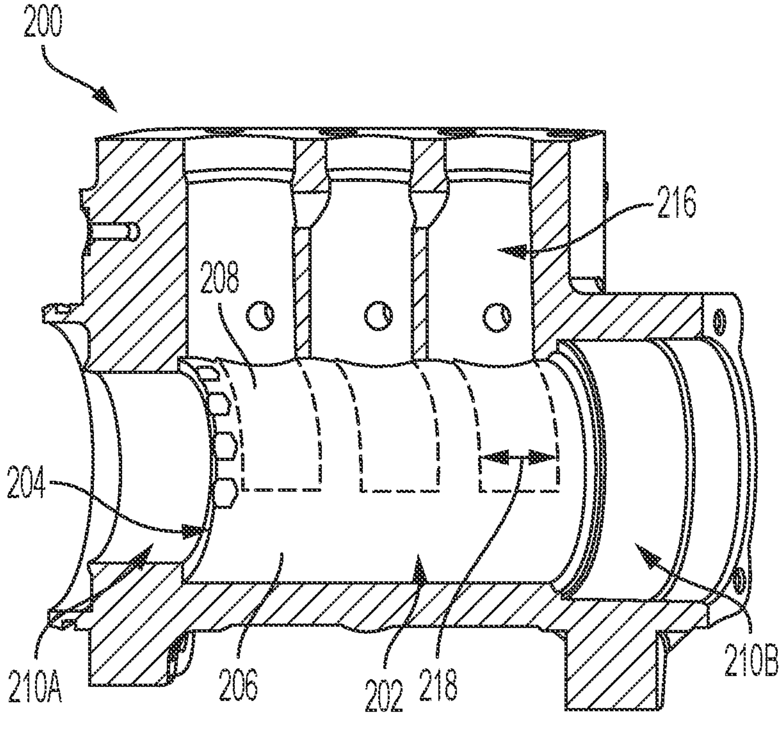
FIG. 3 shows the housing of FIG. 2 from an angled perspective.

FIG. 3 shows the configuration of FIG. 2 from an angled perspective, to clarify how the relief cut portion 208 is a cut made into the wall of the main bore portion 202 of the housing 200. In some examples, the relief cut 208 begins at a portion approximately halfway between the lowest end and the highest end of the main bore 202 and extends toward the tappet housing portion 216. In some examples, the relief cut 208 begins closer to the tappet housing portion 216 than halfway (e.g., a third of the distance between the lowest and highest ends of the main bore 202). In some examples, the relief cut 208 is arch-shaped or semicircular.

In some examples, when there are multiple relief cut portions 208 where each relief cut portion 208 is located between the uncut portion 206 and the tappet housing portion 216, two neighboring relief cut portions 208 may be separated by an uncut portion 206 therebetween, as shown in FIG. 3. In some examples, a length 218 of the relief cut 208 may be wider than the length of a lobe in the camshaft 112 and narrower than the diameter of the corresponding tappet housing portion 216.

Figure 4:
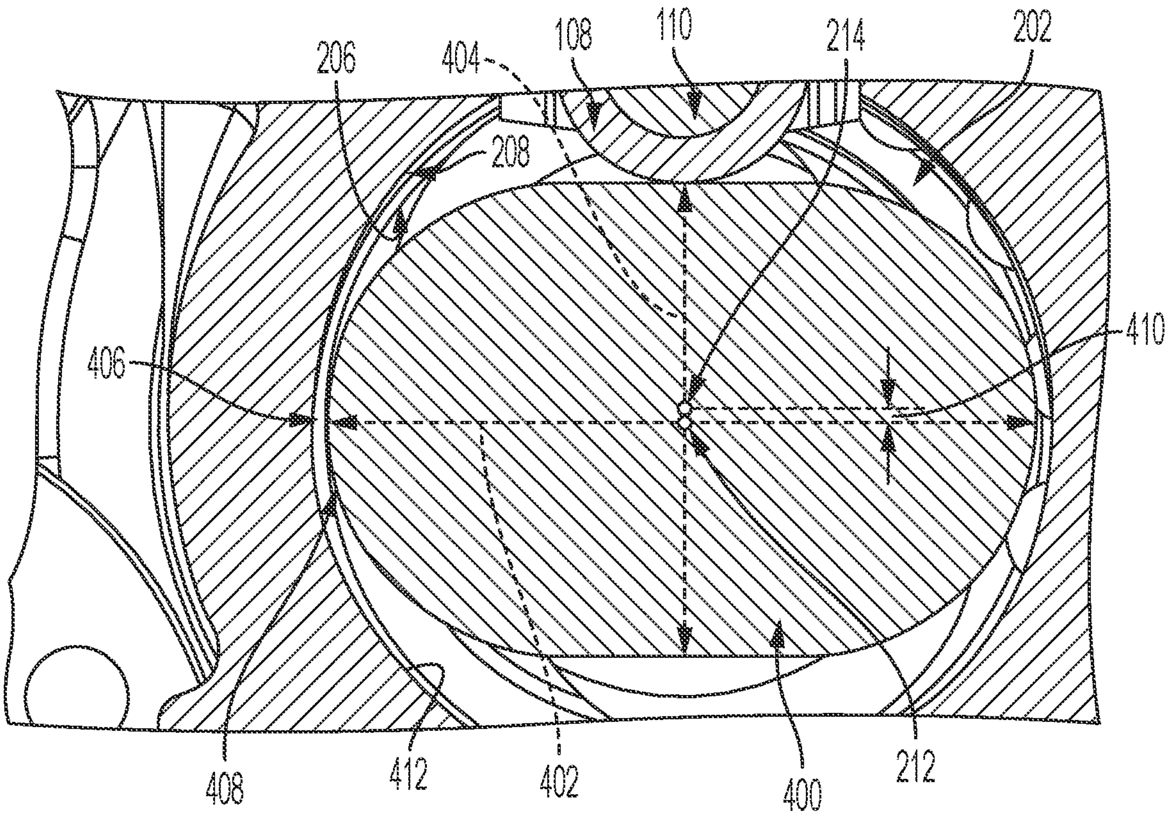
FIG. 4 shows the housing of FIGS. 2 and 3 with tappet assembly and camshaft as viewed along a center axis of the camshaft.

FIG. 4 shows a cross-sectional view of the housing 200, cut along the broken line A-A and viewed from the direction of the arrow "B" in FIG. 2. FIG. 4 also shows the camshaft 112 and a portion of the tappet assembly 101 (the tappet roller 108 and the tappet pin 110) as implemented in the housing 200. Specifically, a lobe 400 of the camshaft 112 is shown in a position which allows the tappet assembly 101 to be in its BDC position 120. The camshaft 112 may include multiple lobes 400 along its length, and the lobes 400 may be angled differently from each other. Also, the number of lobes 400 may equal the number of tappet assemblies 101. As an example, the lobe 400 has a longest diameter 402 and a shortest diameter 404 such that when the tappet assembly 101 (or more specifically, the tappet roller 108) contacts an outer surface 408 of the lobe 400 at the shortest diameter 404, the BDC position 120 is achieved. Alternatively, when the tappet assembly 101 contacts the lobe 400 at the longest diameter 402, the TDC position 122 is achieved.

The centerline 212 of the uncut portion 206 is located at the intersection of the two diameters 402 and 404. The centerline 214 of the relief cut portion 208 is offset (see 410) at a certain distance from the centerline 212 and is located above it, closer toward the tappet assembly 101. The relief cut portion 208 and the uncut portion 206 are shown to have a different amount of clearance 406 between the outer surface 408 of the lobe 400 and an inner wall 412 of the main bore portion 202. Specifically, the clearance 406, or the amount of space between the camshaft 112 and the housing 200, is greater at the relief cut portion 208 than at the uncut portion 206. In some examples, the narrowest clearance 406 must be at least 1 mm, at least 1.5 mm, at least 2 mm, at least 3 mm, or at least 5 mm, depending on the application of the housing 200. Furthermore, the lobe 400 has an axis of rotation at the longitudinal axis of the camshaft 112, as defined by the centerline 212 of the uncut portion 206. The axis of rotation is offset from the central longitudinal axis of the housing 200 defined by the centerline 214 of the relief cut portion 208.

Figure 5:
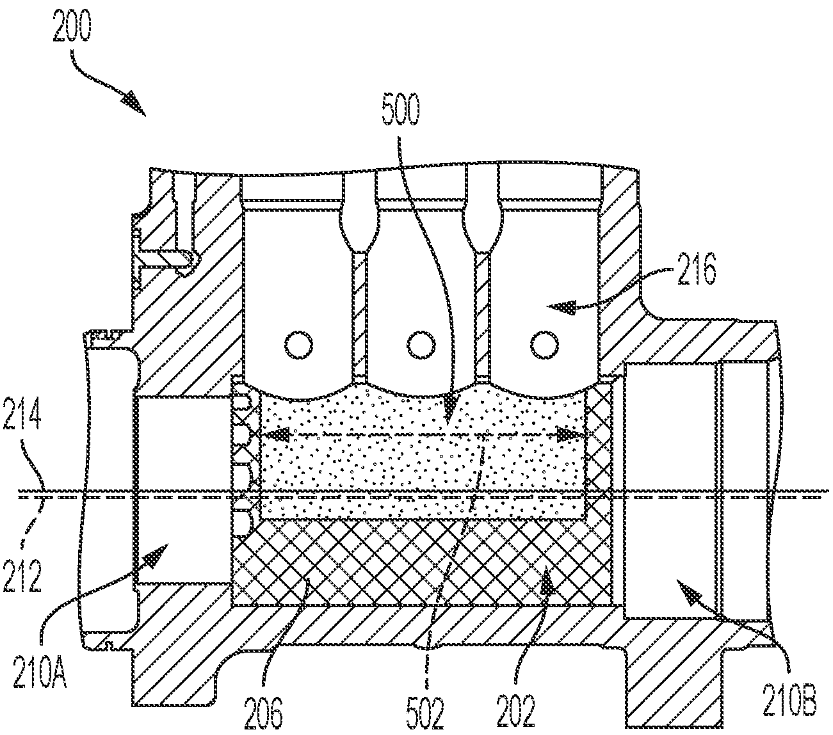
FIG. 5 shows an alternative design for the pump housing of FIG. 2 with a relief cut portion.

FIG. 5 shows an example of an alternative configuration for FIG. 2, where instead of a plurality of relief cut portions 208, there is a single relief cut 500 which has a length 502 spanning across the diameters of the plurality of tappet housing portions 216. In such configurations, the length 502 is greater than the diameter of each tappet housing portion 216. As such, instead of each tappet housing portion 216 having a corresponding relief cut portion 208 as shown in FIG. 2, the configuration of FIG. 5 has a single continuous relief cut portion 500 which can accommodate one or more (in the illustrated example, all three) tappet housing portions 216. In some examples, there may be fewer or more tappet housing portions 216. In some examples, there may be a plurality of relief cuts with different lengths such that one of the relief cuts may have a length to accommodate one tappet housing portion whereas another relief cut may have a different length accommodate two or more tappet housing portions. Therefore, the relief cut which accommodates one tappet housing portion has a length less than the diameter of the tappet housing portion, and the relief cut which accommodates multiple tappet housing portions has a length greater than the diameter of any of the multiple tappet housing portions. Any suitable combination of lengths may be implemented, as appropriate.

Figure 6:
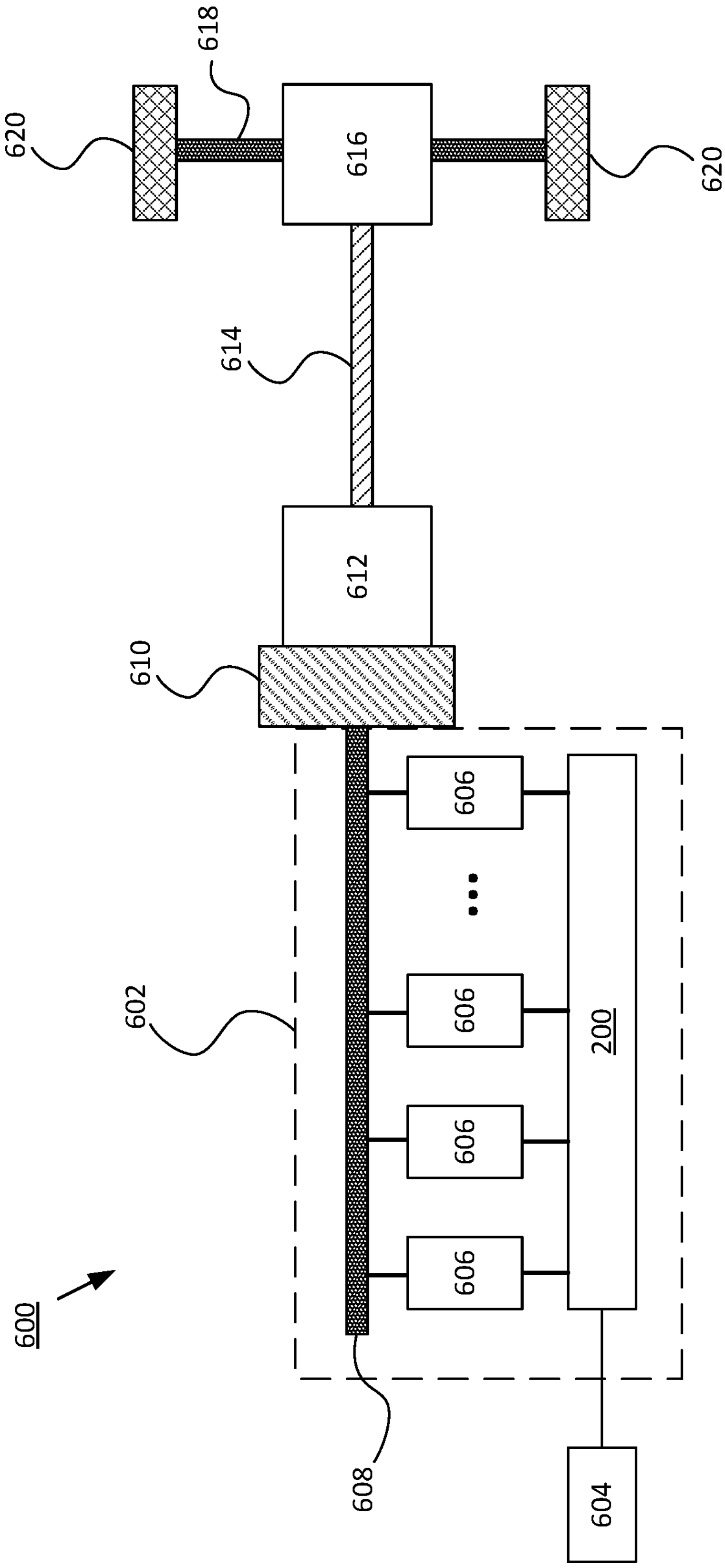
FIG. 6 is a schematic diagram of a vehicle implementing an engine with the fuel pump housing according to examples disclosed herein.

FIG. 6 shows a vehicle 600 which implements an engine 602, which includes the fuel pump system according to embodiments disclosed herein. An engine control unit 604 is operatively coupled with the engine, or more specifically to the fuel pump system, to operate the fuel pump system. The fuel pump system includes the housing 200 for a common-rail multi-cylinder fuel pump, a plurality of pistons 606, and a crankshaft 608. The housing 200 is operatively coupled with the pistons 606 which are operatively coupled with the crankshaft 608, as shown. The crankshaft 608 is connected to a torque converter 610 such as a flywheel, and the torque converter 610 is operatively coupled with a transmission 612. The transmission 612 is operatively coupled with and functions to rotate a driveshaft 614, which is coupled with a differential 616 configured to rotate a final drive 618 whose resulting torque translates to the rotational torque used to move the wheels 620 of the vehicle 600. For simplicity, components of the engine, transmission, etc., as well as any additional components of the vehicle are not shown, but it is to be understood that the figure is not meant to be limiting, and that any additional suitable component may be incorporated, as known in the art.

Advantages of the aforementioned design for the fuel pump housing as disclosed herein include increased versatility, e.g., the capability to allow multiple different applications of camshaft to fit into the same housing without making adjustments to the designs and dimensions to accommodate for individual application. The clearance may facilitate allows additional space for a tappet follower to run over the tappet bores from the pump housing. Additionally, the relief cuts improve camshaft lobe clearance to allow multiple applications to fit into the same housing even when these applications have different camshaft lift requirements. Furthermore, the offset center axes of the main bore reduce the need for deburring as well as the need to clean up the bottom surface of the housing of any burr which may have formed and detached from the housing or the camshaft.

Although the disclosure has been described in detail with reference to certain preferred embodiments, variations and modifications exist within the spirit and scope of the disclosure as described and defined in the following claims.

What is claimed is:

1. A fuel pump housing comprising:

at least one tappet housing portion configured to receive at least one tappet assembly;

a main bore portion fluidly coupled with the at least one tappet housing portion, the main bore portion configured to receive a camshaft; and side bearing portions positioned adjacent to the main bore portion, wherein the main bore portion comprises an uncut portion and at least one relief cut portion proximal to the at least one tappet housing portion, the uncut portion defining a first centerline and the relief cut portion defining a second centerline offset from the first centerline, and the side bearing portions share a central axis with the second centerline.

2. The fuel pump housing of claim 1, wherein the first centerline is offset from a central longitudinal axis of the housing and aligns with a longitudinal axis of the camshaft.

3. The fuel pump housing of claim 1, wherein the second centerline aligns with a central longitudinal axis of the housing and is positioned closer to the at least one tappet housing portion than the first centerline.

4. The fuel pump housing of claim 1, wherein the at least one relief cut portion is formed to increase clearing between an outer surface of a lobe of the camshaft and an inner wall of the main bore portion.

5. The fuel pump housing of claim 1, wherein the at least one relief cut portion has a length shorter than a diameter of the corresponding tappet housing portion.

6. The fuel pump housing of claim 1, wherein the housing is made of a single monolithic piece of metal.

7. The fuel pump housing of claim 1, wherein a fillet is formed at a transition portion between one of the side bearing portions and the main bore portion to reduce sharp edge at the transition portion.

8. The fuel pump housing of claim 1, wherein a fillet is formed at a transition portion between the at least one tappet housing portion and the at least one relief cut portion to reduce sharp edge at the transition portion.

9. The fuel pump housing of claim 1, wherein the at least one tappet housing portion is a plurality of tappet housing portions, and one or more of the at least one relief cut portion has a length spanning across diameters of at least two of the plurality of tappet housing portions.

10. The fuel pump housing of claim 9, wherein a single continuous relief cut portion has the length spanning across the diameters of the plurality of tappet housing portions.

11. A fuel pump system for an engine comprising:
- at least one tappet assembly;
- a camshaft operatively coupled with the at least one tappet assembly; and
- a fuel pump housing comprising:
  - at least one tappet housing portion configured to receive the at least one tappet assembly;
  - a main bore portion fluidly coupled with the at least one tappet housing portion, the main bore portion configured to receive the camshaft; and
  - side bearing portions positioned adjacent to the main bore portion,
- wherein the main bore portion comprises an uncut portion and at least one relief cut portion proximal to the at least one tappet housing portion, the uncut portion defining a first centerline and the relief cut portion defining a second centerline offset from the first centerline, and the side bearing portions share a central axis with the second centerline.

12. The fuel pump system of claim 11, wherein the first centerline is offset from a central longitudinal axis of the housing and aligns with a longitudinal axis of the camshaft.

13. The fuel pump system of claim 11, wherein the second centerline aligns with a central longitudinal axis of the housing and is positioned closer to the at least one tappet housing portion than the first centerline.

14. The fuel pump system of claim 11, wherein the at least one relief cut portion is formed to increase clearing between an outer surface of a lobe of the camshaft and an inner wall of the main bore portion.

15. The fuel pump system of claim 11, wherein the housing is made of a single monolithic piece of metal.

16. The fuel pump system of claim 11, wherein a fillet is formed at a transition portion between one of the side bearing portions and the main bore portion to reduce sharp edge at the transition portion.

17. The fuel pump system of claim 11, wherein a fillet is formed at a transition portion between the at least one tappet housing portion and the at least one relief cut portion to reduce sharp edge at the transition portion.

18. An engine comprising:
- a fuel pump system comprising:
  - a plurality of tappet assemblies;
  - a camshaft operatively coupled with the at least one tappet assembly; and
  - a fuel pump housing comprising:
    - a plurality of tappet housing portions configured to receive respective ones of the plurality of tappet assemblies; and
    - a main bore portion fluidly coupled with the plurality of tappet housing portions, the main bore portion configured to receive the camshaft,
  - wherein the main bore portion comprises an uncut portion and a single relief cut portion proximal to the at least one tappet housing portion, the uncut portion defining a first centerline and the relief cut portion defining a second centerline offset from the first centerline, the relief cut portion having a length along the second centerline that spans across at least two of the plurality of tappet housing portions that are spaced from one another along the second centerline;
- a plurality of pistons operatively coupled with the fuel pump system; and
- a crankshaft operatively coupled with the plurality of pistons.

19. The engine of claim 18, wherein the fuel pump housing includes side bearing portions positioned adjacent to the main bore portion, the side bearing portions sharing a central axis with the second centerline.

20. The engine of claim 18, wherein the length of the relief cut portion of the fuel pump housing spans across all of the plurality of tappet housing portions.

* * * * *